US012733024B2

(12) United States Patent
Tao

(10) Patent No.: US 12,733,024 B2
(45) Date of Patent: Sep. 8, 2026

(54) SIGNAL RECEIVING METHOD AND APPARATUS, USER EQUIPMENT, BASE STATION, AND STORAGE MEDIUM

(71) Applicant: Beijing Xiaomi Mobile Software Co., Ltd., Beijing (CN)

(72) Inventor: Xuhua Tao, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 306 days.

(21) Appl. No.: 18/580,372

(22) PCT Filed: Jul. 20, 2021

(86) PCT No.: PCT/CN2021/107444
§ 371 (c)(1),
(2) Date: Jan. 18, 2024

(87) PCT Pub. No.: WO2023/000178
PCT Pub. Date: Jan. 26, 2023

(65) Prior Publication Data
US 2025/0097967 A1 Mar. 20, 2025

(51) Int. Cl.
*H04L 27/26* (2006.01)
*H04L 5/00* (2006.01)
(Continued)

(52) U.S. Cl.
CPC ........... *H04W 72/51* (2023.01); *H04L 5/0051* (2013.01); *H04L 27/26025* (2021.01); *H04W 72/12* (2013.01)

(58) Field of Classification Search
CPC ....... H04W 72/51; H04W 72/12; H04W 4/02; H04W 8/24; H04W 24/08; H04L 5/0051;
(Continued)

(56) References Cited

U.S. PATENT DOCUMENTS

2020/0052943 A1 2/2020 Jassal et al.
2020/0235877 A1 7/2020 Manolakos et al.
2021/0083730 A1* 3/2021 Hwang ................ H04B 7/0408

FOREIGN PATENT DOCUMENTS

CN 112995958 A 6/2021
JP 2020503791 A 1/2020
WO 2020029736 A1 2/2020

OTHER PUBLICATIONS

Huawei, HiSilicon, Discussion on RSTD measurement, 3GPP TSG-RAN WG4 Meeting #95-e, R4-2007841, Electronic Meeting, May 25-Jun. 5, 2020 (Year: 2020).*
(Continued)

*Primary Examiner* — Said M Elnoubi
(74) *Attorney, Agent, or Firm* — Finnegan, Henderson, Farabow, Garrett & Dunner, L.L.P.

(57) ABSTRACT

A method for receiving a signal is performed by a user equipment (UE), and includes: sending capability information to a base station, wherein the capability information is configured to indicate whether the UE supports a capability of receiving signals corresponding to different sub-carrier spacings (SCSs) simultaneously; and obtaining a scheduling instruction sent by the base station based on the capability information, and receiving the signals based on the scheduling instruction.

16 Claims, 7 Drawing Sheets receiving capability information indicating whether the UE supports the capability 1 and/or whether the UE supports the capability 2 sent by the UE

1201 sending a scheduling instruction to the UE based on the capability information, and sending the signals to the UE based on the scheduling instruction

1202

(51) Int. Cl.
*H04W 72/12* (2023.01)
*H04W 72/51* (2023.01)

(58) Field of Classification Search
CPC ... H04L 27/26025; H04L 5/00; H04L 5/0053; H04L 5/0094; H04L 5/0048
See application file for complete search history.

(56) References Cited

OTHER PUBLICATIONS

International Search Report and Written Opinion of International Application No. PCT/CN2021/107444, dated Mar. 1, 2022, 12 pages.
Huawei, "FL summary #4 of 8.5.4 latency improvements for DL and DL+UL methods", 3GPP TSG RAN WG1 #105-e, R1-2106183, e-Meeting, May 10-May 27, 2021, 10 pages.
Office Action for Russian Application No. 2024103282/07, dated Aug. 28, 2024, 18 pages.
Notice of Reasons for Refusal Office Action for Japanese Patent Application No. 2024-502695, dated Jan. 28, 2025, 10 pages.
3GPP TS 38.306 V16.5.0 (Jun. 2021); Technical Specification; 3rd Generation Partnership Project; Technical Specification Group Radio Access Network; NR; User Equipment (UE) radio access capabilities; (Release 16).
The First Office Action for Chinese Application No. 202180002215.5, dated Mar. 14, 2025, 15 pages.
"Discussion on RSTD measurement", Huawei. HiSilicon, 3GPP TSG-RAN WG4 Meeting #95-e, R4-2007841, Electronic Meeting, May 25-Jun. 5, 2020, 10 pages.
"RAN4 UE features list for Rel-16", NTT Docomo, Inc., 3GPP TSG-RAN WG4 Meeting #94-e-Bis, R4-2005193, Electronic Meeting, Apr. 20-30, 2020, 65 pages.
Extended European Search Report issued in Application No. 21950443.8 dated Apr. 23, 2025, 11 pages.
Notice of Reasons for Refusal issued by the Japanese Patent Office on Jun. 3, 2025, in corresponding Application No. JP 2024-502695, 9 pages.

* cited by examiner

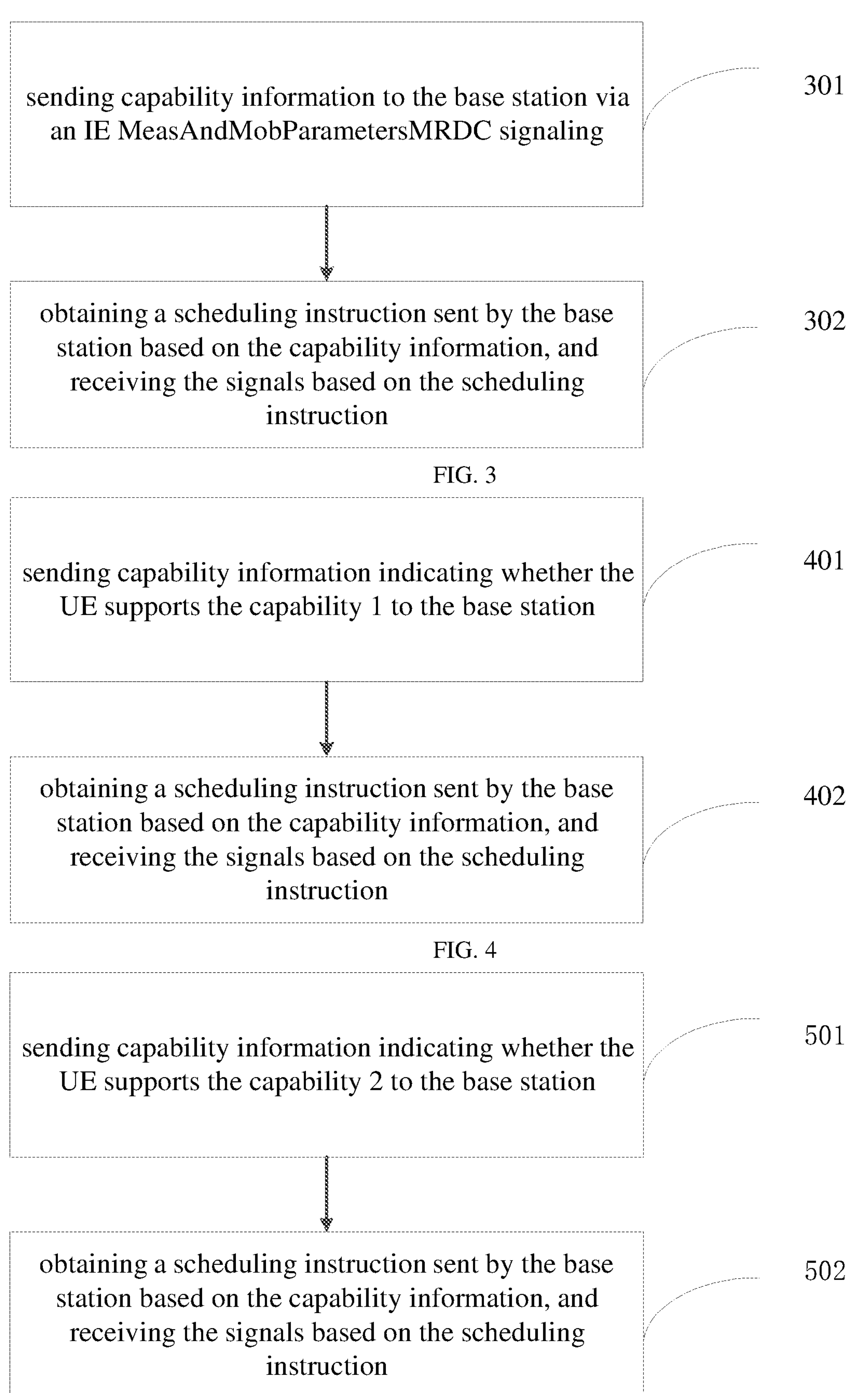
sending capability information to the base station via an IE MeasAndMobParametersMRDC signaling
301
obtaining a scheduling instruction sent by the base station based on the capability information, and receiving the signals based on the scheduling instruction
302
FIG. 3
sending capability information indicating whether the UE supports the capability 1 to the base station
401
obtaining a scheduling instruction sent by the base station based on the capability information, and receiving the signals based on the scheduling instruction
402
FIG. 4
sending capability information indicating whether the UE supports the capability 2 to the base station
501
obtaining a scheduling instruction sent by the base station based on the capability information, and receiving the signals based on the scheduling instruction
502
FIG. 5

SIGNAL RECEIVING METHOD AND APPARATUS, USER EQUIPMENT, BASE STATION, AND STORAGE MEDIUM

CROSS REFERENCE TO RELATED APPLICATIONS

This application is a national phase application of International Application No. PCT/CN2021/107444, filed Jul. 20, 2021, the content of which is incorporated herein by reference.

TECHNICAL FIELD

The disclosure relates to a field of communication technologies, and particularly to a method and an apparatus for receiving a signal, a user equipment (UE), a base station, and a storage medium.

BACKGROUND

In a communication system, a user equipment (UE) generally receives different types of signals (for example, a data signal of a current serving cell, a reference signal of the current serving cell and a reference signal of a neighbor cell) scheduled by a base station on a same bandwidth part (BWP). Sub-carrier spacings (SCSs) corresponding to different types of signals may vary. A method for how a UE receives signals corresponding to different SCSs has not been defined. Therefore, a method for receiving a signal is urgently needed to define how the UE receives the signals corresponding to different SCSs.

SUMMARY

According to an aspect of embodiments of the disclosure, a method for receiving a signal is provided, and performed by a UE. The method includes:

sending capability information to a base station, in which the capability information is configured to indicate whether the UE supports a capability of receiving signals corresponding to different sub-carrier spacings (SCSs) simultaneously; and obtaining a scheduling instruction sent by the base station based on the capability information, and receiving the signals based on the scheduling instruction.

According to another aspect of embodiments of the disclosure, a method for receiving a signal is provided, and performed by a base station. The method includes:

receiving capability information sent by a user equipment (UE), in which the capability information is configured to indicate whether the UE supports a capability of receiving signals corresponding to different sub-carrier spacings (SCSs) simultaneously; and sending a scheduling instruction to the UE based on the capability information, and sending the signals to the UE based on the scheduling instruction.

According to another aspect of embodiments of the present disclosure, a user equipment (UE) is provided, and includes: a transceiver, a memory, and a processor respectively connected to the transceiver and the memory. The processor is configured to:

send capability information to a base station, in which the capability information is configured to indicate whether the UE supports a capability of receiving signals corresponding to different sub-carrier spacings (SCSs) simultaneously; and obtain a scheduling instruction sent by the base station based on the capability information, and receive the signals based on the scheduling instruction.

BRIEF DESCRIPTION OF THE DRAWINGS

The above and/or additional aspects and advantages of the present disclosure will become obvious and easy to understand from the following description of the embodiments in conjunction with the accompanying drawings.

FIG. 3 is a flowchart illustrating a method for receiving a signal according to yet another embodiment of the present disclosure;

FIG. 4 is a flowchart illustrating a method for receiving a signal according to still another embodiment of the present disclosure;

FIG. 5 is a flowchart illustrating a method for receiving a signal according to still another embodiment of the present disclosure;

DETAILED DESCRIPTION

Figures 1, 2:
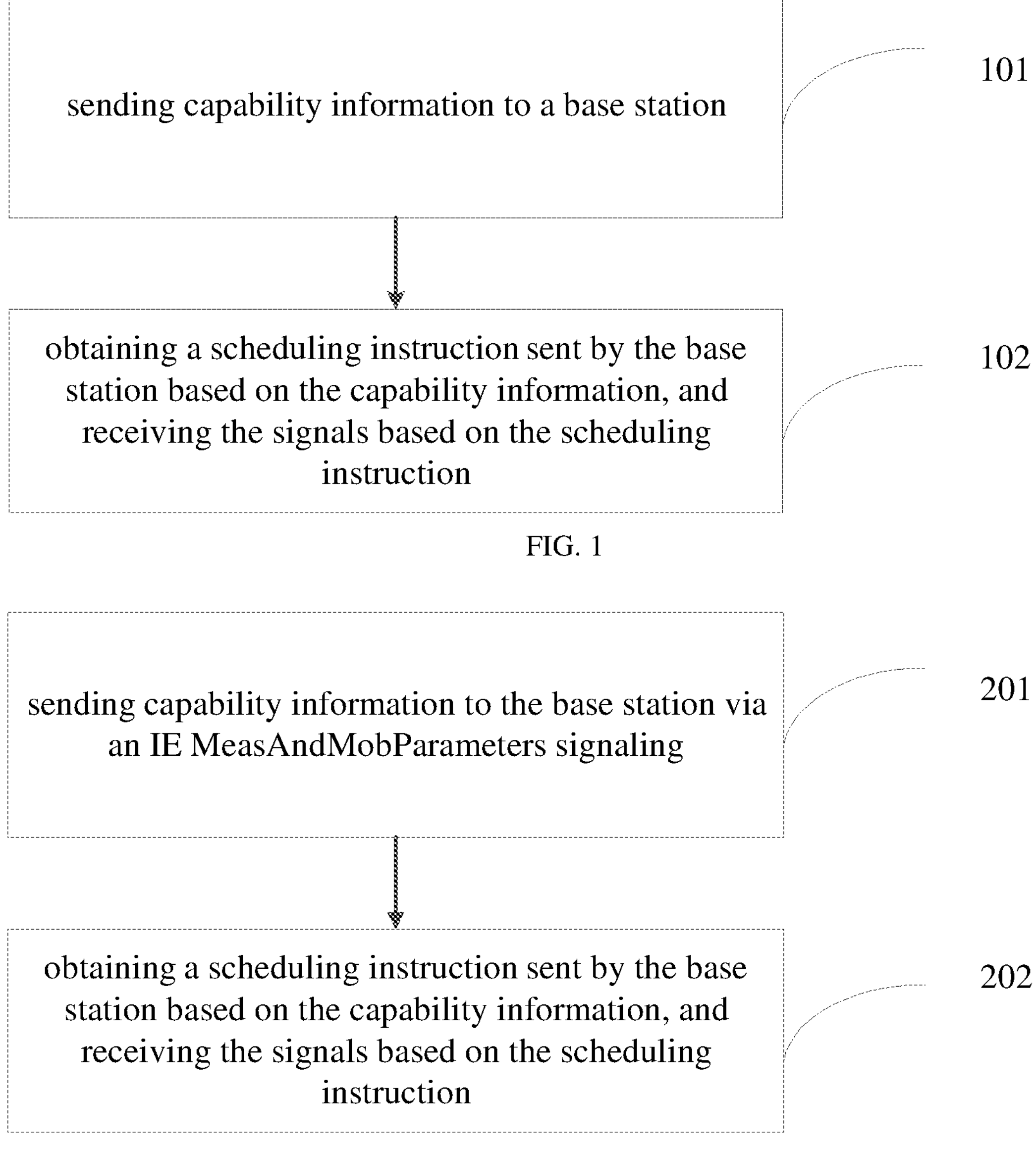
FIG. 1 is a flowchart illustrating a method for receiving a signal according to an embodiment of the present disclosure.
FIG. 2 is a flowchart illustrating a method for receiving a signal according to another embodiment of the present disclosure.

The example embodiments will be described, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "in case of", "if" as used herein may be interpreted as "in a case that" or "when" or "in response to determining".

The embodiments of the present disclosure are described below. Examples of the embodiments are shown in the accompanying drawing, in which the constant same or similar labels indicate the same or similar elements. Embodiments described herein with reference to drawings are explanatory, serve to explain the disclosure, and are not construed to limit embodiments of the disclosure.

In a method for receiving a signal provided in embodiments of the present disclosure, a UE may send capability information to a base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to the different SCSs simultaneously based on the scheduling instruction. Therefore, the disclosure provides the method for receiving the signal for defining how the UE receives the signals corresponding to different SCSs, which ensure stability of signal reception.

A method and an apparatus for receiving a signal, a user equipment (UE), a base station and a storage medium provided in the present disclosure are described below with reference to the accompanying drawings.

FIG. 1 is a flowchart illustrating a method for determining a signal according to an embodiment of the present disclosure. The method is performed by a user equipment (UE). As illustrated in FIG. 1, the method for receiving the signal may include following steps.

At step 101, capability information is sent to a base station.

It is noted that the method for receiving the signal provided in embodiments of the present disclosure is performed by any UE. The UE may refer to a device that provides voice and/or data connectivity for a user. The UE may communicate with one or more core networks via a radio access network (RAN). The UE may be an internet of things (IoT) terminal such as a sensor device and a mobile phone (or referred to as a cellular phone), and a computer having an IoT terminal such as a fixed, portable, compact, handheld, computer built-in or vehicle apparatus. For example, a station (STA), a subscriber unit, a subscriber station, a mobile station, a mobile, a remote station, an access point, a remote terminal, an access terminal, a user terminal or a user agent. Alternatively, the UE may be a device of an unmanned aerial vehicle (UAV). Alternatively, the UE may be a vehicle device, and for example, may be a vehicle computer with a wireless communication function, or a wireless terminal externally connected to a vehicle computer. Alternatively, the UE may be a roadside device, and for example, may be a street lamp, a signal lamp or other roadside device with a wireless communication function.

In an embodiment of the disclosure, the method of sending the capability information to the base station by the UE may include: sending the capability information to the base station via an IE MeasAndMobParameters signaling.

In another embodiment of the disclosure, the method of sending the capability information to the base station by the UE may include: sending the capability information to the base station via an IE MeasAndMobParametersMRDC (multi-radio access technology dual connectivity) signaling.

And in an embodiment of the disclosure, the capability information may be configured to indicate whether the UE supports a capability of receiving signals corresponding to different sub-carrier spacings (SCSs) simultaneously when communication of the signals corresponding to different SCSs is performed on the same BWP.

It is noted that, in an embodiment of the disclosure, it is generally occurred that communication of different types of signals (corresponding to different SCSs) is performed on the same BWP. For example, in an embodiment of the disclosure, in a process of mobility measurement of the UE, the UE may obtain a switching instruction from the UE. The switching instruction is configured to indicate the UE to switch to a target BWP overlapping with a frequency domain of a positioning reference signal (PRS) to be measured of a neighbor cell, and then the UE may switch to the target BWP based on the switching instruction, so as to receive and measure the PRS to be measured on the target BWP. At this case, in an embodiment of the disclosure, the UE may further receive a reference signal of a current serving cell on the target BWP, to maintain a service of the current serving cell. In this case, a case that "communication of the PRS to be measured, the reference signal of the current serving cell and a data signal of the current serving cell is performed simultaneously on the same bandwidth part (BWP)" may occur, and the PRS to be measured, the reference signal of the current serving cell and the data signal of the current serving cell may correspond to different SCSs respectively.

Based on the above case, in an embodiment of the disclosure, the capability information may be configured to indicate at least one of:

- whether the UE supports a capability 1, in which in any embodiment of the disclosure, the capability 1 may include: when a positioning reference signal (PRS) to be measured and a data signal of a current serving cell correspond to different SCSs, the UE being capable of receiving the PRS to be measured and the data signal of the current serving cell simultaneously; or
- whether the UE supports a capability 2, in which in any embodiment of the disclosure, the capability 2 may include: when a positioning reference signal (PRS) to be measured and a reference signal of a current serving cell correspond to different SCSs, the UE being capable of receiving the PRS to be measured and the reference signal of the current serving cell simultaneously.

Based on the above contents, in an embodiment of the disclosure, the capability information may be only configured to indicate whether the UE supports the capability 1. In another embodiment of the disclosure, the capability information may be only configured to indicate whether the UE supports the capability 2. In another embodiment of the disclosure, the capability information may be configured to indicate whether the UE supports the capability 1 and/or whether the UE supports the capability 2.

Further, in an embodiment of the present disclosure, the reference signal of the current serving cell may include at least one of:

a synchronous signal block (SSB) of the current serving cell;

a channel state information reference signal (CSI-RS) of the current serving cell; or a PRS of the current serving cell.

In an embodiment of the disclosure, the reference signal of the current serving cell may include any one of the above signals. In another embodiment of the disclosure, the reference signal of the current serving cell may be any two combinations of the above signals or all of the above three signals.

At step 102, a scheduling instruction sent by the base station based on the capability information is obtained, and the signals are received based on the scheduling instruction.

In an embodiment of the disclosure, the scheduling instruction may be specifically configured to indicate whether the base station schedules the signals corresponding to different SCSs simultaneously on the target BWP.

Specifically, in an embodiment of the disclosure, when the capability information sent by the UE to the base station indicates that the UE supports a capability of receiving the signals corresponding to different sub-carrier spacings (SCSs) simultaneously, the base station may send to the UE the scheduling instruction for indicating that scheduling the signals corresponding to different SCSs is performed simultaneously on the target BWP, so that the UE may receive the signals corresponding to different SCSs simultaneously on the target BWP. In another embodiment of the disclosure, when the capability information sent by the UE to the base station indicates that the UE does not support the capability of receiving the signals corresponding to different sub-carrier spacings (SCSs) simultaneously, the base station may send to the UE a scheduling instruction for indicating that scheduling the signals corresponding to the different SCSs is not performed simultaneously on the target BWP, so that the UE may only receive one of the signals corresponding to different SCSs on the target BWP.

It is noted that, in an embodiment of the disclosure, when contents included in the capability information sent from the UE are different (for example, only including whether to support the capability 1, only including whether to support the capability 2, or including whether to support the capability 1 and/or the capability 2), the scheduling instructions obtained by the UE may be different. A detailed introduction of this part may refer to a detailed introduction of subsequent embodiments.

In summary, in the method for receiving the signal provided in embodiments of the present disclosure, the UE may send the capability information to the base station. The capability information is configured to indicate whether the UE supports the capability of receiving the signals corresponding to different sub-carrier spacings (SCSs) simultaneously. The UE may obtain the scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

FIG. 2 is a flowchart illustrating a method for receiving a signal according to an embodiment of the present disclosure. The method is performed by a user equipment (UE). As illustrated in FIG. 2, the method for receiving the signal may include following steps.

At step 201, the capability information is sent to the base station via an IE MeasAndMobParameters signaling.

At step 202, a scheduling instruction sent by the base station based on the capability information is obtained, and the signals are received based on the scheduling instruction.

The descriptions of steps 201 to 202 may refer to related descriptions of the above embodiments of the present disclosure, which will not be repeated here.

In summary, in the method for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

FIG. 3 is a flowchart illustrating a method for receiving a signal according to an embodiment of the present disclosure. The method is performed by a user equipment (UE). As illustrated in FIG. 3, the method for receiving the signal may include following steps.

At step 301, the capability information is sent to the base station via an IE MeasAndMobParametersMRDC signaling.

At step 302, a scheduling instruction sent by the base station based on the capability information is obtained, and the signals are received based on the scheduling instruction.

The descriptions of steps 301 to 302 may refer to related descriptions of the above embodiments of the present disclosure, which will not be repeated here.

In summary, in the method for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

FIG. 4 is a flowchart illustrating a method for receiving a signal according to an embodiment of the present disclosure. The method is performed by a user equipment (UE). As illustrated in FIG. 4, the method for receiving the signal may include following steps.

At step 401, capability information indicating whether the UE supports the capability 1 is sent to the base station.

The descriptions with respect to sending the capability information and the capability 1 to the base station may refer to related descriptions of the above embodiments of the disclosure, which will not be repeated here.

At step 402, a scheduling instruction sent by the base station based on the capability information is obtained, and the signals are received based on the scheduling instruction.

In an embodiment of the disclosure, when the capability information indicates that the UE supports the capability 1 at step 401, at step 402, the UE may obtain a scheduling instruction for indicating that a PRS to be measured and a data signal of a current serving cell are scheduled simultaneously on the target BWP which is sent by the base station, and receive the PRS to be measured and the data signal of the current serving cell simultaneously on the target BWP, so that the UE may receive the data signal of the current serving cell simultaneously during a period of measuring a PRS of a neighbor cell.

In another embodiment of the disclosure, when the capability information indicates that the UE does not support the capability 1 at step 401, at step 402, a scheduling instruction for indicating that the PRS to be measured is scheduled on the target BWP which is sent by the base station is acquired, and the PRS to be measured is received on the target BWP, and the UE may not receive the data signal of the current serving cell during the period of measuring the PRS of the neighbor cell.

In summary, in the method for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

FIG. 5 is a flowchart illustrating a method for receiving a signal according to an embodiment of the present disclosure. The method is performed by a user equipment (UE). As illustrated in FIG. 5, the method for receiving the signal may include following steps.

At step 501, capability information indicating whether the UE supports the capability 2 is sent to the base station.

The descriptions with respect to sending the capability information and the capability 2 to the base station via the signaling may refer to description of the above embodiments of the disclosure, which will not be repeated here.

At step 502, a scheduling instruction sent by the base station based on the capability information is obtained, and the signals are received based on the scheduling instruction.

In an embodiment of the disclosure, when the capability information indicates that the UE supports the capability 2 at step 501, at step 502, the UE obtains a scheduling instruction for indicating that a PRS to be measured and a reference signal of a current serving cell are scheduled simultaneously on a target BWP which is sent by the base station, and receive the PRS to be measured and the reference signal of the current serving cell simultaneously on the target BWP, so that the UE may receive and measure the reference signal of the current serving cell simultaneously during a period of measuring a PRS of a neighbor cell.

In another embodiment of the disclosure, when the capability information indicates that the UE does not support the capability 2 at step 501, at step 502, the UE obtains a scheduling instruction for indicating that the PRS to be measured is scheduled on the target BWP which is sent by the base station, and receives the PRS to be measured on the target BWP, and the UE may not receive and measure the reference signal of the current serving cell during the period of measuring the PRS of the neighbor cell.

In summary, in the method for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

Figures 6, 7, 8:
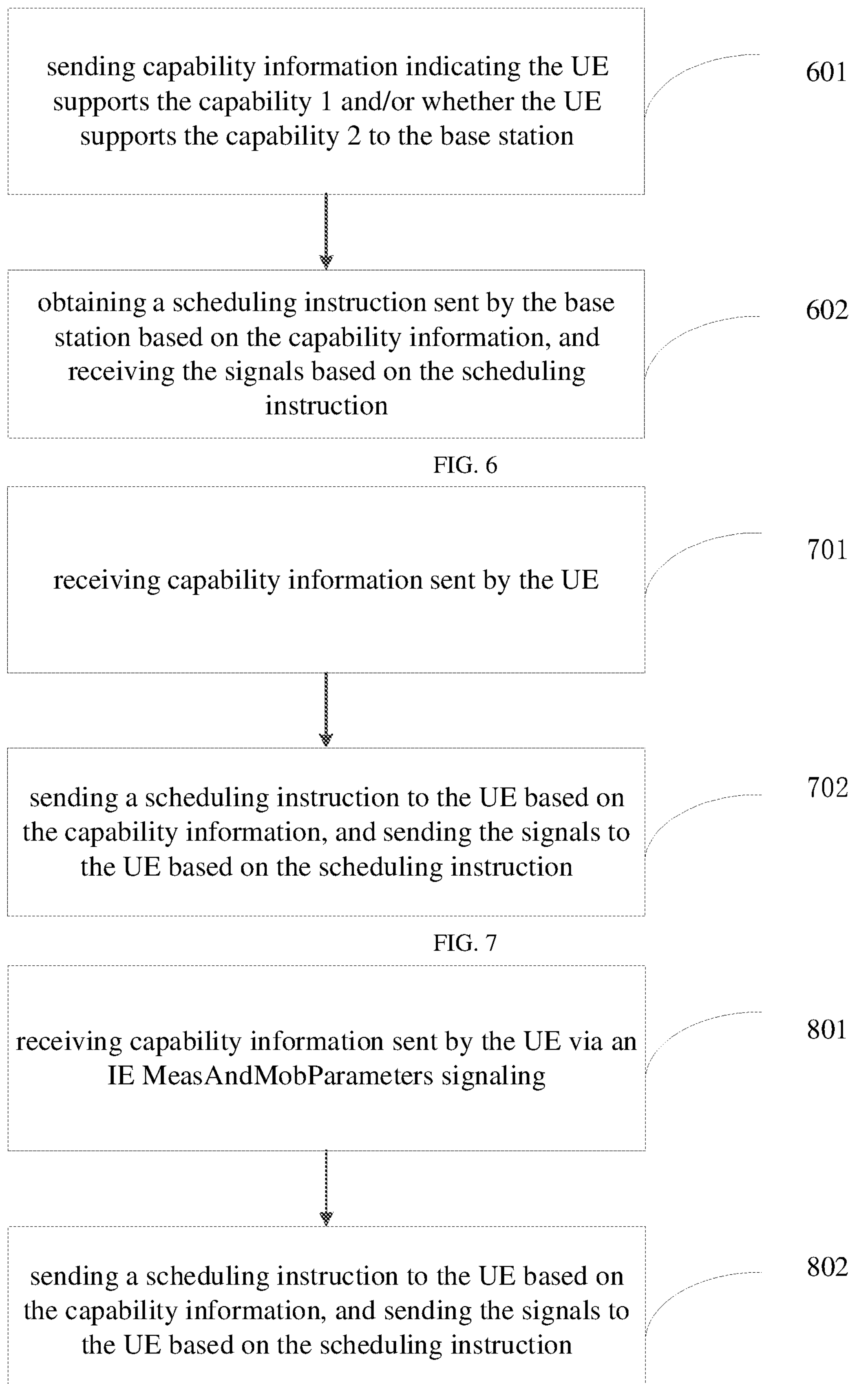
FIG. 6 is a flowchart illustrating a method for receiving a signal according to still another embodiment of the present disclosure.
FIG. 7 is a flowchart illustrating a method for receiving a signal according to still another embodiment of the present disclosure.
FIG. 8 is a flowchart illustrating a method for receiving a signal according to still another embodiment of the present disclosure.

FIG. 6 is a flowchart illustrating a method for receiving a signal according to an embodiment of the present disclosure. The method is performed by a user equipment (UE). As illustrated in FIG. 6, the method for receiving the signal may include following steps.

At step 601, capability information indicating whether the UE supports the capability 1 and/or whether the UE supports the capability 2 is sent to the base station.

The descriptions with respect to sending the capability information to the base station via the signaling may refer to the above descriptions, which will not be repeated here.

At step 602, a scheduling instruction sent by the base station based on the capability information is obtained, and the signals are received based on the scheduling instruction.

In an embodiment of the disclosure, when the capability information indicates whether the UE supports the capability 1 and/or the UE supports the capability 2 at step 601, at step 602, the UE may obtain a scheduling instruction for indicating that a PRS to be measured, a reference signal of a current serving cell and a data signal of the current serving cell are to scheduled simultaneously on a target BWP which is sent by the base station, and receive the PRS to be measured, the reference signal of the current serving cell and the data signal of the current serving cell simultaneously on the target BWP, so that the UE may receive the reference signal of the current serving cell and the data signal of the current serving cell simultaneously during a period of measuring a PRS of a neighbor cell.

In another embodiment of the disclosure, when the capability information indicates that the UE supports the capability 1 and does not support the capability 2 at step 601, at step 602, the UE may obtain a scheduling instruction for indicating that the PRS to be measured and the data signal of the current serving cell are scheduled simultaneously on the target BWP which is sent by the base station, and receive the PRS to be measured and the data signal of the current serving cell simultaneously on the target BWP, so that the UE may not receive and measure the reference signal of the current serving cell simultaneously during the period of measuring the PRS of the neighbor cell.

In another embodiment of the disclosure, when the capability information indicates that the UE supports the capability 2 and does not support the capability 1 at step 601, at step 602, the UE may obtain a scheduling instruction for indicating that the PRS to be measured and the reference signal of the current serving cell are scheduled simultaneously on the target BWP which is sent by the base station, and receive the PRS to be measured and the reference signal of the current serving cell simultaneously on the target BWP, and the UE may not receive the data signal of the current serving cell simultaneously during the period of measuring the PRS to be measured.

In another embodiment of the disclosure, when the capability information indicates that the UE does not support the capability 1 and does not support the capability 2 at step 601, at step 602, the UE may obtain a scheduling instruction for indicating that the PRS to be measured is scheduled on the target BWP which is sent by the base station, and receive the PRS to be measured on the target BWP, and the UE may not receive the data signal of the current serving cell and may not measure the reference signal of the current serving cell during the period of measuring the PRS of the neighbor cell.

There may be following possible implementations in embodiments of the present disclosure.

The UE does not support the capability 1 and the capability 2 by default. When capability indication information sent by the UE indicates that the UE supports the capability 1, it indicates that the UE supports the capability 1 and does not UE support the capability 2. When the capability indication information sent by the UE indicates that the UE supports the capability 2, it indicates that the UE supports the capability 2 and does not support the capability 1.

Alternatively, the UE supports the capability 1 and the capability 2 by default. When the capability indication information sent by the UE indicates that the UE does not support the capability 2, it indicates that the UE supports the capability 1 and does not support the capability 2. When the capability indication information sent by the UE indicates that the UE does not support the capability 1, it indicates that the UE supports the capability 2 and does not support the capability 1.

In summary, in the method for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

FIG. 7 is a flowchart illustrating a method for receiving a signal according to an embodiment of the present disclosure. The method is performed by a base station. As illustrated in FIG. 7, the method for receiving the signal may include following steps.

At step 701, capability information sent by a UE is received.

In an embodiment of the disclosure, the method of receiving the capability information by the base station may include: receiving the capability information sent by the UE via an IE MeasAndMobParameters signaling.

In another embodiment of the disclosure, the method of receiving the capability information by the base station may include: receiving the capability information sent by the UE via an IE MeasAndMobParametersMRDC signaling.

And in an embodiment of the disclosure, the capability information may be configured to indicate whether the UE supports a capability of receiving signals corresponding to different sub-carrier spacings (SCSs) simultaneously when communication of the signals corresponding to different SCSs is performed on the same BWP.

It is noted that, in an embodiment of the disclosure, it is generally occurred that communication of different types of signals (corresponding to different SCSs) is performed on the same BWP. For example, in an embodiment of the disclosure, in a process of mobility measurement of the UE, the UE may obtain a switching instruction from the UE. The switching instruction is configured to indicate the UE to switch to a target BWP overlapping with a frequency domain of a positioning reference signal (PRS) to be measured of a neighbor cell. And then the UE may switch to the target BWP based on the switching instruction, so as to receive and measure the PRS to be measured on the target BWP. At this case, in an embodiment of the disclosure, the UE may further receive a reference signal of a current serving cell on the target BWP, to maintain a service of the current serving cell. In this case, a case that "communication of the PRS to be measured, the reference signal of the current serving cell and a data signal of the current serving cell is performed simultaneously on the same bandwidth part (BWP)" may occur, and the PRS to be measured, the reference signal of the current serving cell and the data signal of the current serving cell may correspond to different SCSs respectively.

Based on the above case, in an embodiment of the disclosure, the capability information may be configured to indicate at least one of:

whether the UE supports a capability 1, in which in any embodiment of the disclosure, the capability 1 may include: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, in which in any embodiment of the disclosure, the capability 2 may include: when a positioning reference signal (PRS) to be measured and a reference signal of a current serving cell correspond to different SCSs, the UE being capable of receiving the PRS to be measured and the reference signal of the current serving cell simultaneously.

Based on the above content, in an embodiment of the disclosure, the capability information may be only configured to indicate whether the UE supports the capability 1. In another embodiment of the disclosure, the capability information may be only configured to indicate whether the UE supports the capability 2. In another embodiment of the disclosure, the capability information may be configured to indicate whether the UE supports the capability 1 and/or whether the UE supports the capability 2.

Further, in an embodiment of the present disclosure, the reference signal of the current serving cell may include at least one of:

a synchronous signal block (SSB) of the current serving cell;

a channel state information reference signal (CSI-RS) of the current serving cell; or a PRS of the current serving cell.

In an embodiment of the disclosure, the reference signal of the current serving cell may include any one of the above signals. In another embodiment of the disclosure, the reference signal of the current serving cell may be any two combinations of the above signals or all of the above three signals.

At step 702, a scheduling instruction is sent to the UE based on the capability information, and the signals are sent to the UE based on the scheduling instruction.

In an embodiment of the disclosure, the scheduling instruction may be specifically configured to indicate whether the base station schedules the signals corresponding to different SCSs simultaneously on the target BWP.

Specifically, in an embodiment of the disclosure, when the capability information sent by the UE to the base station indicates that the UE supports a capability of receiving the signals corresponding to different sub-carrier spacings (SCSs) simultaneously, the base station may send to the UE the scheduling instruction for indicating that scheduling the signals corresponding to different SCSs is performed simultaneously on the target BWP, so that the UE may receive the signals corresponding to different SCSs simultaneously on the target BWP. In another embodiment of the disclosure, when the capability information sent by the UE to the base station indicates that the UE does not support the capability of receiving the signals corresponding to different sub-carrier spacings (SCSs) simultaneously, the base station may send to the UE a scheduling instruction for indicating that scheduling the signals corresponding to the different SCSs is not performed simultaneously on the target BWP, so that the UE may only receive one of the signals corresponding to different SCSs on the target BWP.

It is noted that, in an embodiment of the disclosure, when contents included in the capability information sent from the UE are different (for example, only including whether to support the capability 1, only including whether to support the capability 2, or including whether to support the capability 1 and/or the capability 2), the scheduling instruction sent from the base station to the UE may be different. A detailed introduction of this part may refer to a detailed introduction of subsequent embodiments.

In summary, in the method for receiving the signal provided in embodiments of the present disclosure, the base station may receive the capability information sent by the UE. The capability information is configured to indicate whether the UE supports the capability of receiving the signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

FIG. 8 is a flowchart illustrating a method for receiving a signal according to an embodiment of the present disclosure. The method is performed by a base station. As illustrated in FIG. 8, the method for receiving the signal may include following steps.

At step 801, the capability information sent by the UE via an IE MeasAndMobParameters signaling is received.

At step 802, a scheduling instruction is sent to the UE based on the capability information, and the signals are sent to the UE based on the scheduling instruction.

The descriptions of steps 801 to 802 may refer to related descriptions of the above disclosure, which will not be repeated here.

In summary, in the method for receiving the signal provided in embodiments of the present disclosure, the base station may receive capability information sent by the UE. The capability information is configured to indicate whether the UE supports a capability of receiving signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

Figures 9, 10, 11:
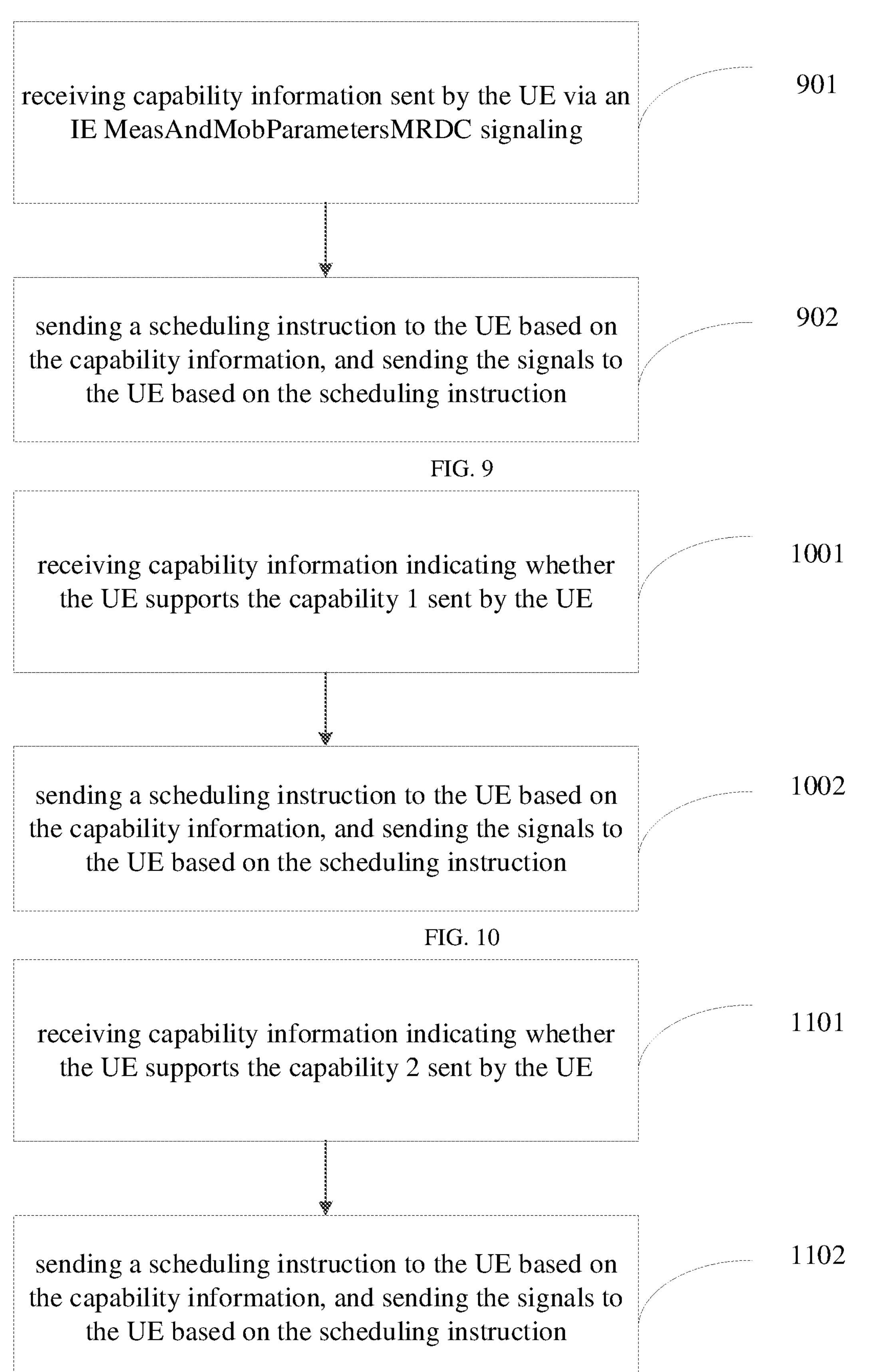
FIG. 9 is a flowchart illustrating a method for receiving a signal according to still another embodiment of the present disclosure.
FIG. 10 is a flowchart illustrating a method for receiving a signal according to still another embodiment of the present disclosure.
FIG. 11 is a flowchart illustrating a method for receiving a signal according to still another embodiment of the present disclosure.

FIG. 9 is a flowchart illustrating a method for receiving a signal according to an embodiment of the present disclosure. The method is performed by a base station. As illustrated in FIG. 9, the method for receiving the signal may include following steps.

At step 901, the capability informations sent by the UE via an IE MeasAndMobParametersMRDC signaling is received.

At step 902, a scheduling instruction is sent to the UE based on the capability information, and the signals are sent to the UE based on the scheduling instruction.

The descriptions of steps 901 to 902 may refer to related descriptions of the above disclosure, which will not be repeated here.

In summary, in the method for receiving the signal provided in embodiments of the present disclosure, the base station may receive capability information sent by the UE. The capability information is configured to indicate whether the UE supports a capability of receiving signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

FIG. 10 is a flowchart illustrating a method for receiving a signal according to an embodiment of the present disclosure. The method is performed by a base station. As illustrated in FIG. 10, the method for receiving the signal may include following steps.

At step 1001, capability information indicating whether the UE supports the capability 1 which is sent by the UE is received.

The descriptions with respect to the capability information and the capability 1 may refer to related descriptions of the above embodiments of the disclosure, which will not be repeated here.

At step 1002, a scheduling instruction is sent to the UE based on the capability information, and the signals are sent to the UE based on the scheduling instruction.

In an embodiment of the disclosure, when the capability information indicates that the UE supports the capability 1 at step 1001, at step 1002, the base station may send to the UE a scheduling instruction for indicating that a PRS to be measured and a data signal of a current serving cell are scheduled simultaneously on the target BWP, and send the PRS to be measured and the data signal of the current serving cell simultaneously on the target BWP, so that the UE may receive the data signal of the current serving cell simultaneously during a period of measuring a PRS of a neighbor cell.

In another embodiment of the disclosure, when the capability information indicates the UE does not support the capability 1 at step 1001, at step 1002, the base station may send to the UE a scheduling instruction for indicating that the PRS to be measured is scheduled on target BWP, and send the PRS to be measured on the target BWP, and be incapable of scheduling the data signal of the current serving cell during the period of measuring the PRS to be measured by the UE.

In summary, in the method for receiving the signal provided in embodiments of the present disclosure, the base station may receive capability information from the UE. The capability information is configured to indicate whether the UE supports a capability of receiving signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

FIG. 11 is a flowchart illustrating a method for receiving a signal according to an embodiment of the present disclosure. The method is performed by a base station. As illustrated in FIG. 11, the method for receiving the signal may include following steps.

At step 1101, capability information indicating whether the UE supports the capability 2 which is sent by the UE is received.

The descriptions with respect to the capability information and the capability 2 may refer to related descriptions of the above embodiments of the disclosure, which will not be repeated here.

At step 1102, a scheduling instruction is sent to the UE based on the capability information, and the signals are sent to the UE based on the scheduling instruction.

In an embodiment of the disclosure, when the capability information indicates that the UE supports the capability 2 at step 1101, at step 1102, the base station may send to the UE a scheduling instruction for indicating that a PRS to be measured and a reference signal of a current serving cell are scheduled simultaneously on the target BWP, and send the PRS to be measured and the reference signal of the current serving cell simultaneously on the target BWP, so that the UE may receive and measure the reference signal of the current serving cell simultaneously during a period of measuring a PRS of a neighbor cell.

In another embodiment of the disclosure, when the capability information indicates that the UE does not support the capability 2 at step 1101, at step 1102, the base station may send a scheduling instruction for indicating that the PRS to be measured is scheduled on the target BWP to the UE, and send the PRS to be measured on the target BWP, and be incapable of scheduling the reference signal of the current serving cell during the period of measuring the PRS to be measured by the UE.

In summary, in the method for receiving the signal provided in embodiments of the present disclosure, the base station may receive capability information from the UE. The capability information is configured to indicate whether the UE supports a capability of receiving signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

Figures 12, 13:
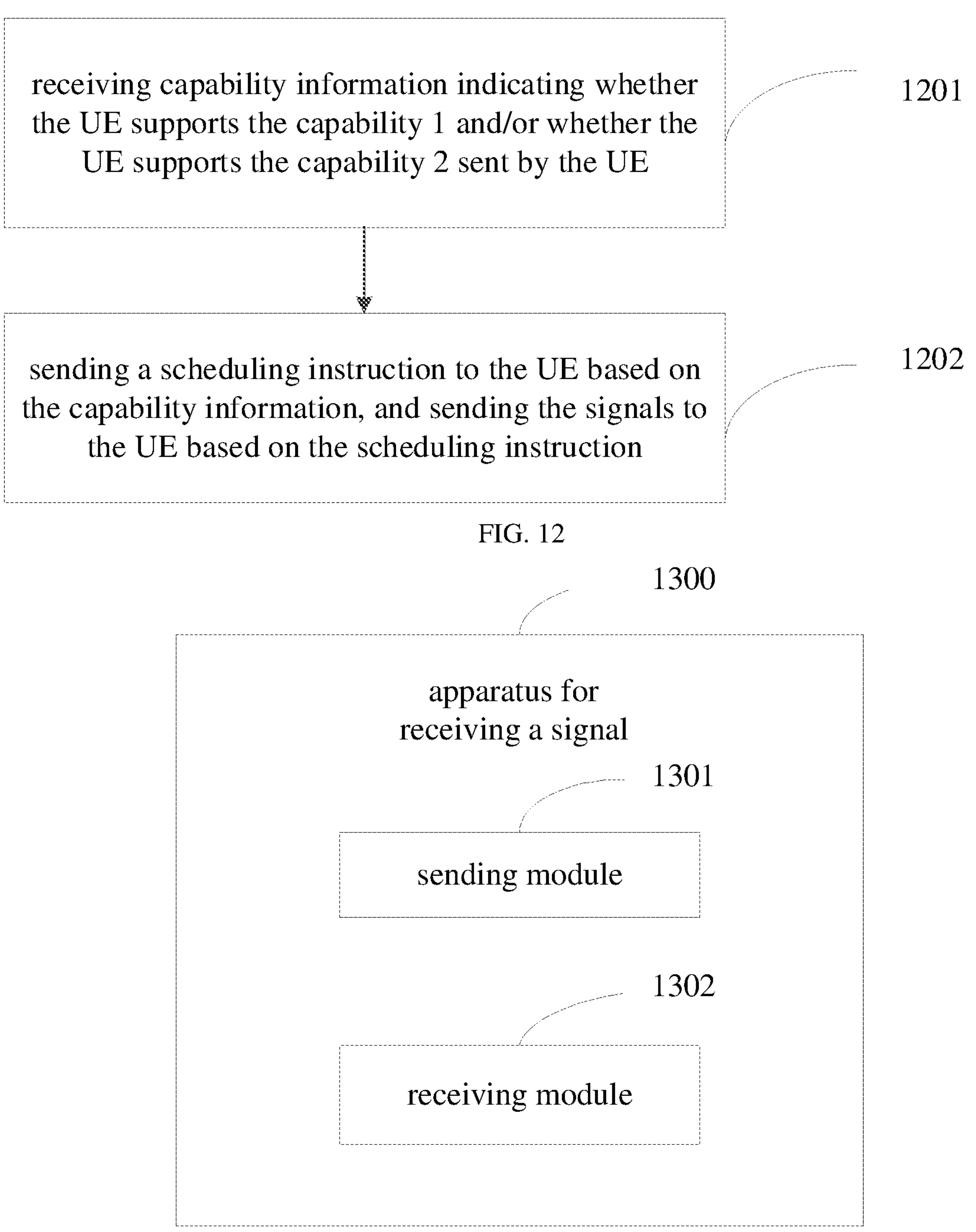
FIG. 12 is a flowchart illustrating a method for receiving a signal according to still another embodiment of the present disclosure.
FIG. 13 is a diagram illustrating a structure of an apparatus for receiving a signal according to an embodiment of the present disclosure.

FIG. 12 is a flowchart illustrating a method for receiving a signal according to an embodiment of the present disclosure. The method is performed by a base station. As illustrated in FIG. 12, the method for receiving the signal may include following steps.

At step 1201, capability information indicating whether the UE supports the capability 1 and/or whether the UE supports the capability 2 from the UE is received.

The descriptions with respect to the capability information may refer to related descriptions of the above embodiments, which will not be repeated here.

At step 1202, a scheduling instruction is sent to the UE based on the capability information, and the signals are sent to the UE based on the scheduling instruction.

In an embodiment of the disclosure, when the capability information indicates whether the UE supports the capability 1 and/or the UE supports the capability 2 at step 1201, at step 1202, the base station may send to the UE a scheduling instruction for indicating that a PRS to be measured, a reference signal of a current serving cell and a data signal of the current serving cell are scheduled simultaneously on the target BWP, and send the PRS to be measured, the reference signal of the current serving cell and the data signal of the current serving cell simultaneously on the target BWP, so that the UE may receive the reference signal of the current serving cell and the data signal of the current serving cell simultaneously during a period of measuring a PRS of a neighbor cell.

In another embodiment of the disclosure, when the capability information indicates that the UE supports the capability 1 and does not support the capability 2 at step 1201, at step 1202, the base station may send to the UE a scheduling instruction for indicating that the PRS to be measured and the data signal of the current serving cell are scheduled simultaneously on the target BWP, and send the PRS to be measured and the data signal of the current serving cell simultaneously on the target BWP, and the UE may not schedule the reference signal of the current serving cell during the period of measuring the PRS to be measured.

In another embodiment of the disclosure, when the capability information indicates that the UE supports the capability 2 and does not support the capability 1 at step 1201, at step 1202, the base station may send to the UE a scheduling instruction for indicating that the PRS to be measured and the reference signal of the current serving cell are scheduled simultaneously on the target BWP, and send the PRS to be measured and the reference signal of the current serving cell simultaneously on the target BWP, and the UE is incapable of scheduling the data signal of the current serving cell simultaneously during the period of measuring the PRS to be measured.

In another embodiment of the disclosure, when the capability information indicates that the UE does not support the capability 2 and does not support the capability 1 at step 1201, at step 1202, the base station may send to the UE a scheduling instruction for indicating that the PRS to be measured is scheduled on the target BWP, and send the PRS to be measured on the target BWP, and the UE is incapable of scheduling the data signal of the current serving cell and the reference signal of the current serving cell during the period of measuring the PRS to be measured.

There may be following possible implementations in embodiments of the present disclosure.

The UE does not support the capability 1 and the capability 2 by default. When capability indication information sent by the UE indicates that the UE supports the capability 1, it indicates that the UE supports the capability 1 and does not UE support the capability 2. When the capability indication information sent by the UE indicates that the UE supports the capability 2, it indicates that the UE supports the capability 2 and does not support the capability 1.

Alternatively, the UE supports the capability 1 and the capability 2 by default. When the capability indication information sent by the UE indicates that the UE does not support the capability 2, it indicates that the UE supports the capability 1 and does not support the capability 2. When the capability indication information sent by the UE indicates that the UE does not support the capability 1, it indicates that the UE supports the capability 2 and does not support the capability 1.

In summary, in the method for receiving the signal provided in embodiments of the present disclosure, the base station may receive capability information from the UE. The capability information is configured to indicate whether the UE supports a capability of receiving signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

FIG. 13 is a diagram illustrating a structure of an apparatus 1300 for receiving a signal according to an embodiment of the present disclosure. The apparatus is applicable for a UE. As illustrated in FIG. 13, the apparatus 1300 for receiving the signal may include a sending module 1301 and a receiving module 1302.

The sending module 1301 is configured to send capability information to a base station. The capability information is configured to indicate whether the UE supports a capability of receiving signals corresponding to different sub-carrier spacings (SCSs) simultaneously.

The receiving module 1302 is configured to obtain a scheduling instruction sent by the base station based on the capability information, and receive the signals based on the scheduling instruction.

In summary, in the apparatus for receiving the signal provided in embodiments of the present disclosure, the UE may send capability information to the base station. The capability information is configured to indicate whether the UE supports a capability of receiving signals corresponding to different sub-carrier spacings (SCSs) simultaneously. The UE may obtain a scheduling instruction for indicating whether the base station schedules the signals corresponding to different SCSs simultaneously on a target BWP which is sent by the base station based on the capability information, and determine whether to receive the signals corresponding to different SCSs simultaneously based on the scheduling instruction. Therefore, the disclosure provides the method for receiving the signal for defining how the UE receives the signals corresponding to different SCSs, which ensure stability of signal reception.

Optionally, in an embodiment of the disclosure, the capability information is configured to indicate at least one of:

whether the UE supports a capability 1, in which the capability 1 includes: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, in which the capability 2 includes: when the positioning reference signal (PRS) to be measured and a reference signal of the current serving cell correspond to different SCSs, the UE being capable of receiving the PRS to be measured and the reference signal of the current serving cell simultaneously.

Optionally, in an embodiment of the present disclosure, the sending module 1301 is further configured to:

send the capability information to the base station via an IE MeasAndMobParameters signaling.

Further, in an embodiment of the present disclosure, the sending module 1301 is further configured to:

send the capability information to the base station via an IE MeasAndMobParametersMRDC signaling.

Further, in an embodiment of the present disclosure, the PRS to be measured includes a PRS to be measured of a neighbor cell.

Further, in an embodiment of the present disclosure, the reference signal of the current serving cell include at least one of:

a synchronous signal block (SSB) of the current serving cell;

a channel state information reference signal (CSI-RS) of the current serving cell; or a PRS of the current serving cell.

Further, in an embodiment of the present disclosure, the sending module 1301 is further configured to:

send capability information indicating whether the UE supports the capability 1 to the base station.

Further, in an embodiment of the present disclosure, the receiving module 1302 is further configured to:

in response to capability information indicating that the UE supports the capability 1, obtain a scheduling instruction for indicating that the PRS to be measured and the data signal of the current serving cell are scheduled simultaneously on a target bandwidth part (BWP) which is sent by the base station, and receive the PRS to be measured and the data signal of the current serving cell simultaneously on the target BWP; and in response to capability information indicating that the UE does not support the capability 1, obtain a scheduling instruction for indicating that the PRS to be measured is scheduled on the target BWP which is sent by the base station, and receive the PRS to be measured on the target BWP, and be incapable of receiving the data signal of the current serving cell during a period of measuring the PRS to be measured by the UE.

Further, in an embodiment of the present disclosure, the sending module 1301 is further configured to:

send capability information indicating whether the UE supports the capability 2 to the base station.

Further, in an embodiment of the present disclosure, the receiving module 1302 is further configured to:

in response to the capability information indicating that the UE supports the capability 2, obtain a scheduling instruction for indicating that the PRS to be measured and the reference signal of the current serving cell are scheduled simultaneously on a target bandwidth part (BWP) which is sent by the base station, and receive the PRS to be measured and the reference signal of the current serving cell simultaneously on the target BWP; and in response to the capability information indicating that the UE does not support the capability 2, obtain a scheduling instruction for indicating that the PRS to be measured is scheduled on the target BWP from the base station, and receive the PRS to be measured on the target BWP, and be incapable of measuring the reference signal of the current serving cell during a period of measuring the PRS to be measured by the UE.

Further, in an embodiment of the present disclosure, the sending module 1301 is further configured to:

send capability information indicating whether the UE supports a capability 1 and whether the UE supports the capability 2 to the base station.

Further, in an embodiment of the present disclosure, the receiving module 1301 is further configured to:

in response to the capability information indicating that the UE supports the capability 1 and the capability 2, obtain a scheduling instruction for indicating that the PRS to be measured, the reference signal of the current serving cell and the data signal of the current serving cell are scheduled simultaneously on a target bandwidth part (BWP) which is sent by the base station, and receive the PRS to be measured, the reference signal of the current serving cell and the data signal of the current serving cell simultaneously on the target BWP;

in response to the capability information indicating that the UE supports the capability 1, and does not support the capability 2, obtain a scheduling instruction for indicating that the PRS to be measured and the data signal of the current serving cell are scheduled simultaneously on the target BWP which is sent by the base station, and receive the PRS to be measured and the data signal of the current serving cell simultaneously on the target BWP, and be incapable of measuring the reference signal of the current serving cell during a period of measuring the PRS to be measured by the UE;

in response to the capability information indicating that the UE supports the capability 2, and does not support the capability 1, obtain a scheduling instruction for indicating that the PRS to be measured and the reference signal of the current serving cell are scheduled on the target BWP which is sent by the base station, and receive the PRS to be measured and the reference signal of the current serving cell simultaneously on the target BWP, and be incapable of receiving the data signal of the current serving cell during a period of measuring the PRS to be measured by the UE; and in response to the capability information indicating that the UE does not support the capability 1, and does not support the capability 2, obtain a scheduling instruction for indicating that the PRS to be measured is scheduled on the target BWP which is sent by the base station, and receive the PRS to be measured on the target BWP, and be incapable of receiving the data signal of the current serving cell and being incapable of measuring the reference signal of the current serving cell during a period of measuring the PRS to be measured by the UE.

Figure 14:
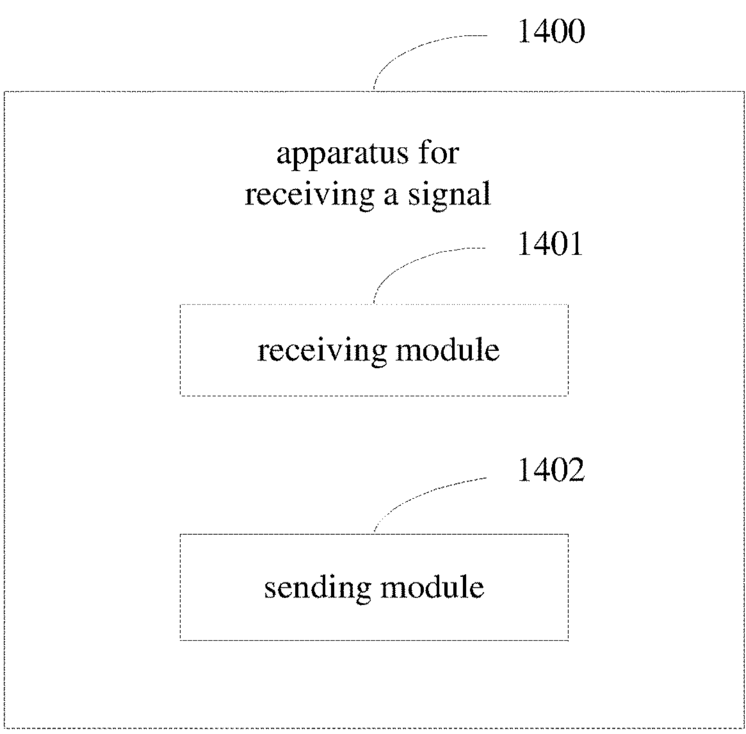
FIG. 14 is a diagram illustrating a structure of an apparatus for receiving a signal according to another embodiment of the present disclosure.

FIG. 14 is a diagram illustrating a structure of an apparatus 1400 for receiving a signal according to an embodiment of the present disclosure. The apparatus is applicable for a base station. As illustrated in FIG. 14, the apparatus 1400 for receiving the signal may include a receiving module 1401 and a sending module 1402.

The receiving module 1401 is configured to receive capability information sent by a user equipment (UE). The capability information is configured to indicate whether the UE supports a capability of receiving signals corresponding to different sub-carrier spacings (SCSs) simultaneously.

The sending module 1402 is configured to send a scheduling instruction to the UE based on the capability information, and send the signals to the UE based on the scheduling instruction.

In summary, in the apparatus for receiving the signal provided in embodiments of the present disclosure, the base station may receive the capability information sent by the UE. The capability information is configured to indicate whether the UE supports the capability of receiving the signals corresponding to different sub-carrier spacings (SCSs) simultaneously. The base station may send a scheduling instruction for indicating whether the base station schedules the signals corresponding to different SCSs simultaneously on the target BWP to the UE based on the capability information, and determine whether to send the signals corresponding to different SCSs simultaneously to the UE based on the scheduling instruction. Therefore, the disclosure provides the method for receiving the signal for defining how the UE receives the signals corresponding to different SCSs, which ensure stability of signal reception.

Optionally, in an embodiment of the disclosure, the capability information is configured to indicate at least one of:

whether the UE supports a capability 1, in which the capability 1 includes: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, in which the capability 2 includes: when a positioning reference signal (PRS) to be measured and a reference signal of a current serving cell correspond to different SCSs, the UE being capable of receiving the PRS to be measured and the reference signal of the current serving cell simultaneously.

Further, in an embodiment of the present disclosure, the receiving module 1401 is further configured to:

receive the capability information sent by the UE via an IE MeasAndMobParameters signaling.

Further, in an embodiment of the present disclosure, the receiving module 1401 is further configured to:

receive the capability information sent by the UE via an IE MeasAndMobParametersMRDC signaling.

Further, in an embodiment of the present disclosure, the PRS to be measured includes a PRS to be measured of a neighbor cell.

Further, in an embodiment of the present disclosure, the reference signal of the current serving cell include at least one of:

a synchronous signal block (SSB) of the current serving cell;

a channel state information reference signal (CSI-RS) of the current serving cell; or a PRS of the current serving cell.

Further, in an embodiment of the present disclosure, the receiving module 1401 is further configured to:

receive capability information indicating whether the UE supports the capability 1 which is sent by the UE.

Further, in an embodiment of the present disclosure, the sending module 1402 is further configured to:

in response to the capability information indicating that the UE supports the capability 1, send to the UE a scheduling instruction for indicating that the PRS to be measured and the data signal of the current serving cell are scheduled simultaneously on a target bandwidth part (BWP), and send the PRS to be measured and the data signal of the current serving cell simultaneously on the target BWP; and in response to the capability information indicating that the UE does not support the capability 1, send to the UE a scheduling instruction for indicating that the PRS to be measured is scheduled on the target BWP, and send the PRS to be measured on the target BWP, and be incapable of scheduling the data signal of the current serving cell during a period of measuring the PRS to be measured by the UE.

Further, in an embodiment of the present disclosure, the receiving module 1402 is further configured to:

receive capability information indicating whether the UE supports the capability 2 which is sent by the UE.

Further, in an embodiment of the present disclosure, the sending module 1402 is further configured to:

in response to the capability information indicating that the UE supports the capability 2, send to the UE a scheduling instruction for indicating that the PRS to be measured and the reference signal of the current serving cell are scheduled simultaneously on a target bandwidth part (BWP), and send the PRS to be measured and the reference signal of the current serving cell simultaneously on the target BWP; and in response to the capability information indicating that the UE does not support the capability 2, send to the UE a scheduling instruction for indicating that the PRS to be measured is scheduled on the target BWP, and send the PRS to be measured on the target BWP, and be incapable of scheduling the reference signal of the current serving cell during a period of measuring the PRS to be measured by the UE.

Further, in an embodiment of the present disclosure, the receiving module 1402 is further configured to:

receive capability information indicating whether the UE supports the capability 1 and whether the UE supports the capability 2 which is sent by the UE.

Further, in an embodiment of the present disclosure, the sending module 1402 is further configured to:

in response to the capability information indicating that the UE supports the capability 1 and the capability 2, send to the UE a scheduling instruction for indicating that the PRS to be measured, the reference signal of the current serving cell and the data signal of the current serving cell are scheduled simultaneously on a target bandwidth part (BWP), and send the PRS to be measured, the reference signal of the current serving cell and the data signal of the current serving cell simultaneously on the target BWP;

in response to the capability information indicating that the UE supports the capability 1, and does not support the capability 2, send to the UE a scheduling instruction for indicating that the PRS to be measured and the data signal of the current serving cell is scheduled simultaneously on the target BWP, and send the PRS to be measured and the data signal of the current serving cell simultaneously on the target BWP, and be incapable of measuring the reference signal of the current serving cell during a period of measuring the PRS to be measured by the UE;

in response to the capability information indicating that the UE supports the capability 2, and does not support the capability 1, send to the UE a scheduling instruction for indicating that the PRS to be measured and the reference signal of the current serving cell are scheduled on the target BWP, and send the PRS to be measured and the reference signal of the current serving cell simultaneously on the target BWP, and be incapable of scheduling the data signal of the current serving cell during a period of measuring the PRS to be measured by the UE; and in response to the capability information indicating that the UE does not support the capability 1, and does not support the capability 2, send to the UE a scheduling instruction for indicating that the PRS to be measured is scheduled on the target BWP, and send the PRS to be measured on the target BWP, and be incapable of scheduling the data signal of the current serving cell and the reference signal of the current serving cell during a period of measuring the PRS to be measured by the UE.

A computer storage medium provided in embodiments of the present disclosure is stored with an executable program. When the executable program is executed by a processor, the method according to any one of FIGS. 1 to 6 or FIGS. 7 to 12 is implemented.

In order to implement the above embodiments, a computer program product including a computer program is further provided in the disclosure. When the computer program is executed by a processor, the method according to any one of FIGS. 1 to 6 or FIGS. 7 to 12 is implemented.

In addition, in order to implement the above embodiments, a computer program is further provided in the disclosure. When the program is executed by a processor, the method according to any one of FIGS. 1 to 6 or FIGS. 7 to 12 is implemented.

Figure 15:
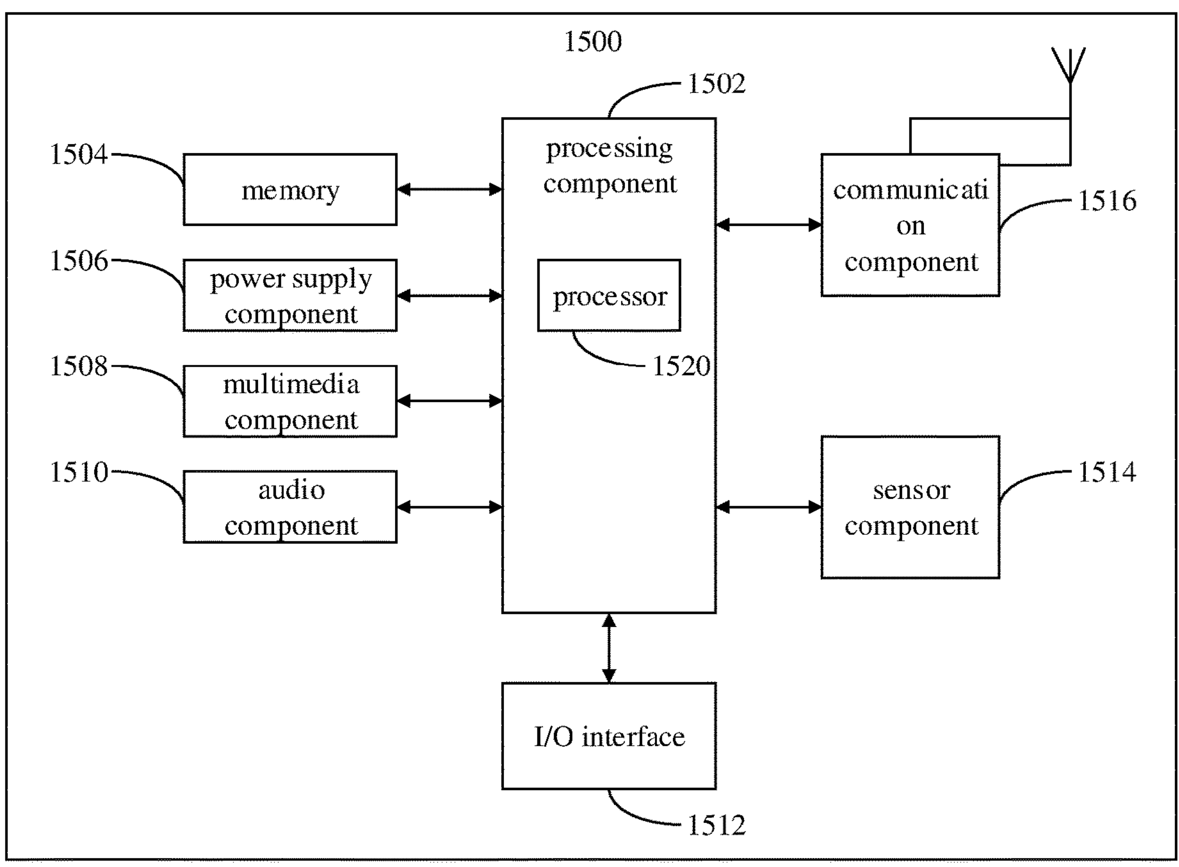
FIG. 15 is a block diagram illustrating a user equipment (UE) according to an embodiment of the present disclosure.

FIG. 15 is a block diagram illustrating a user equipment (UE) 1500 according to an embodiment of the present disclosure. For example, the UE 1500 may be a mobile phone, a computer, a digital broadcasting terminal equipment, a messaging device, a game console, a tablet device, a medical equipment, a fitness equipment, a personal digital assistant, etc.

As illustrated in FIG. 15, the UE 1500 may include at least one component: a processing component 1502, a memory 1504, a power supply component 1506, a multimedia component 1508, an audio component 1510, an input/output (I/O) of interface 1512, a sensor component 1513, and a communication component 1516.

The processing component 1502 generally controls the whole operation of the UE 1500, such as operations related to display, phone call, data communication, camera operation and recording operation. The processing component 1502 may include one or more processors 1520 to perform instructions, to complete all or part of steps of the above method. In addition, the processing component 1502 may include at least one module for the convenience of interaction between the processing component 1502 and other components. For example, the processing component 1502 may include a multimedia module for the convenience of interaction between the multimedia component 1508 and the processing component 1502.

The memory 1504 is configured to store all types of data to support an operation of the UE 1500. Examples of the data include the instructions of any applications or methods operated on the UE 1500, contact data, phone book data, messages, pictures, videos, etc. The memory 1504 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 1506 may provide power supply for all components of the UE 1500. The power supply component 1506 may include a power supply management system, at least one power supply, and other components related to generating, managing and distributing power for the UE 1500.

The multimedia component 1508 includes a screen of an output interface provided between the UE 1500 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 1508 includes a front camera and/or a rear camera. When the UE 1500 is in operation mode, such as a shooting mode or a video mode, the front camera or the rear camera may receive external multimedia data. Each front camera and rear camera may be a fixed optical lens system or an optical lens system with a focal length and an optical zoom capacity.

The audio component 1510 is configured as an output and/or input signal. For example, the audio component 1510 includes a microphone (MIC). When the UE 1500 is in operation mode, such as call mode, record mode, and speech recognition mode, a microphone is configured to receive external audio signals. The audio signals received may be further stored in the memory 1504 or sent via the communication component 1516. In some embodiments, the audio component 1510 further includes a speaker configured to output an audio signal.

The I/O interface 1512 provides an interface for the processing component 1502 and the peripheral interface module, and the peripheral interface module may be a keyboard, a click wheel, a button, etc. The buttons may include but not limited to a home button, a volume button, a start button and a lock button.

The sensor component 1513 includes at least one sensor configured to provide status assessments in all aspects for the UE 1500. For example, the sensor component 1513 may detect an on/off state of the UE 1500 and relative positioning of the component. For example, the component is a display and a keypad of the UE 1500. The sensor component 1513 may further detect a location change of the UE 1500 or one component of the UE 1500, presence or absence of contact between the user and the UE 1500, an orientation or acceleration/deceleration of the UE 1500, and a temperature change of the UE 1500. The sensor component 1513 may include a proximity sensor, which is configured to detect the existence of the objects nearby without any physical contact. The sensor component 1513 may further include a light sensor such as a CMOS or CCD image sensor, which is configured to use in imaging applications. In some embodiments, the sensor component 1513 may further include an acceleration transducer, a gyroscope sensor, a magnetic sensor, a pressure sensor or a temperature sensor.

The communication component 1516 may be configured for the convenience of wired or wireless communication between the UE 1500 and other devices. The UE 1500 may access wireless networks based on a communication standard, such as WiFi, 2G or 3G, or their combination. In an example embodiment, the communication component 1516 receives broadcast signals or broadcast-related information from an external broadcast management system via a broadcast channel. In an exemplary embodiment, the communication units 1516 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an example embodiment, the UE 1500 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 16:
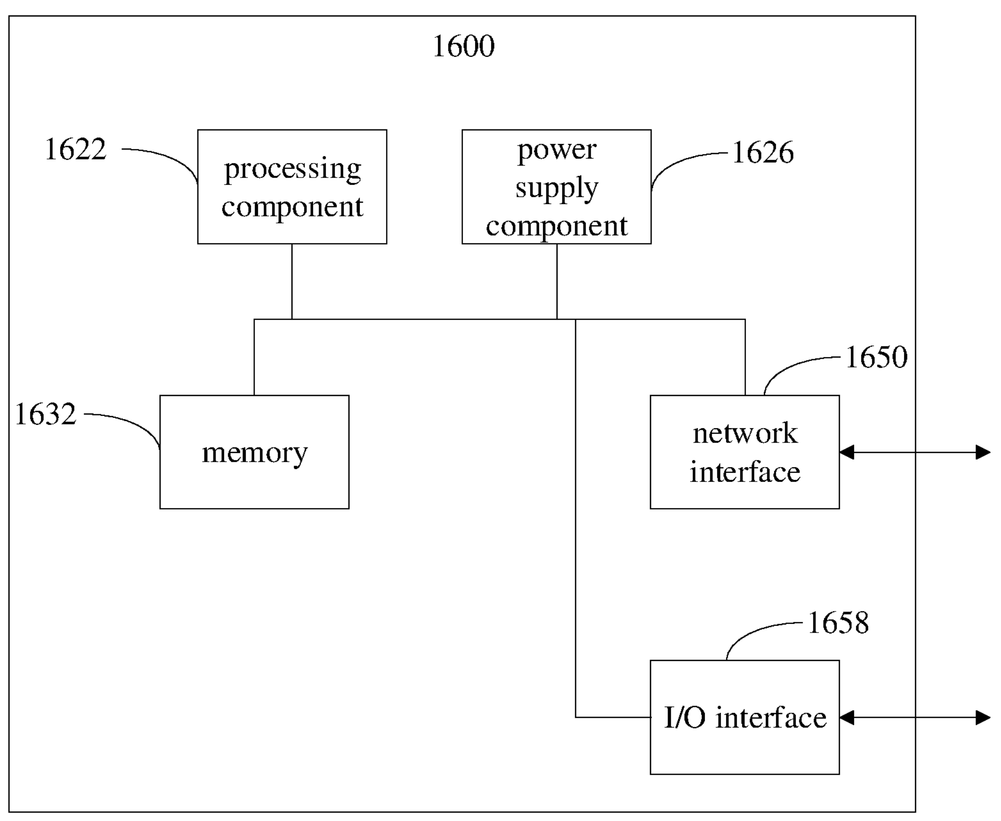
FIG. 16 is a block diagram illustrating a base station according to an embodiment of the present disclosure.

FIG. 16 is a block diagram illustrating a base station 1600 according to embodiments of the present disclosure. For example, the base station 1600 may be provided as a base station. As illustrated in FIG. 16, a base station 1600 includes a processing component 1611, which further includes at least one processor, and memory resources represented by the memory 1632, which are configured to store instructions executable by the processing component 1622, for example, an application. The application stored in the memory 1632 may include one or more modules each of which corresponds to a set of instructions. In addition, the processing component 1615 is configured to execute instructions, to perform the any method applicable to the base station as described in the above method, for example, the method as illustrated in FIG. 1.

The base station 1600 may further include one power supply component 1626 configured to execute power management of the base station 1600, one wired or wireless network interface 1650 configured to connect the base station 1600 to a network, and one input/output (I/O) interface 1658. The base station 1600 may operate an operating system stored in the memory 1632, for example, Windows Server™, Mac OS X™, Unix™, Linux™, Free BSD™ or similar.

In embodiments provided in the disclosure, methods provided in embodiments of the present disclosure are introduced mainly from the perspective of the base station and the UE. To achieve various functions in the methods provided in embodiments of the disclosure, the base station and the UE may include a hardware structure and a software module, to achieve the above functions in the form of the hardware structure, the software module or a combination of the hardware structure and the software module. A certain function in the above functions may be performed by the hardware structure, the software module or a combination of the hardware structure and the software module.

A communication apparatus is provided according to embodiments of the present disclosure. The communication apparatus may include a transceiving module and a processing module. The transceiving module may include a sending module and/or a receiving module. The sending module is configured to implement a sending function. The receiving module is configured to implement a receiving function. The transceiving module may implement a sending function and/or a receiving function.

The communication apparatus may be a terminal device (a terminal device in the above method embodiments), an apparatus in the terminal device, or an apparatus capable of being used with the terminal device. Alternatively, the communication apparatus may be a network device, an apparatus in the network device, or an apparatus capable of being used with the network device.

Another communication apparatus is provided according to embodiments of the present disclosure. The communication apparatus may be a network device, a terminal device (a terminal device in the above method embodiments), a chip, a system on chip or a processor that supports the network device to implement the method, or a chip, a system on chip or a processor that supports the terminal device to implement the method. The apparatus may be configured to implement the method described in the method embodiments, and may refer to descriptions in the method embodiments.

The communication apparatus may include one or more processors. The processor may include a general purpose processor or a dedicated purpose processor. For example, the processor 141 may be a baseband processor or a central processor. The baseband processor may be configured to process a communication protocol and communication data, and the central processor may be configured to control a communication device (e.g., a base station, a baseband chip, a terminal device, a terminal device chip, a DU or CU, etc.), to execute a computer program, and process data of the computer program.

Optionally, the communication apparatus may further include one or more memories with a computer program stored thereon. The processor executes the computer program so that the communication apparatus performs the method as described in the above method embodiments. Optionally, the memory may further store data. The communication apparatus and the memory may be independently configured independently or integrated together.

Optionally, the communication apparatus may further include a transceiver and an antenna. The transceiver may be referred to as a transceiving unit, a transceiver or a transceiving circuit, which may be configured to achieve a transceiving function. The transceiver may include a receiver and a transmitter. The receiver may be referred to as a receiver or a receiving circuit, etc., for implementing a receiving function; the transmitter may be referred to as a transmitter or a transmission circuit, etc. for implementing a transmission function.

Optionally, the communication apparatus may further include one or more interface circuits. The interface circuit is configured to receive code instructions and transmit the code instructions to the processor. The processor runs the code instructions so that the communication apparatus performs the method as described in the above method embodiment.

The communication apparatus is a terminal device (a terminal device in the above method embodiments). The processor is configured to perform the method according to any one of FIGS. 1 to 4.

The communication apparatus is a network device. The transceiver is configured to perform the method according to any one of FIGS. 5 to 8.

In an implementation, the processor may include a transceiver configured to implement receiving and transmitting functions. For example, the transceiver may be a transceiving circuit, or an interface, or an interface circuit. The transceiving circuit, the interface or the interface circuit configured to implement receiving and transmitting functions may be separate or integrated together. The transceiving circuit, the interface or the interface circuit may be configured to read and write codes/data, or the transceiving circuit, the interface or the interface circuit may be configured to transmit or deliver a signal.

In an implementation, the processor may be stored with a computer program. The computer program runs on the processor so that the communication apparatus performs the method as described in the above method embodiments. The computer program may be solidified in the processor, in which case the processor may be implemented by a hardware.

In an implementation, the communication apparatus may include a circuit that may implement a transmitting or receiving or communication function in the above method embodiments. The processor and the transceiver described in the disclosure may be implemented on integrated circuits (ICs), analog ICs, radio frequency integrated circuits (RFICs), mixed signal ICs, application specific integrated circuits (ASICs), printed circuit boards (PCBs), electronic devices, etc. The processor and the transceiver may further be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe) and gallium arsenide (GaAs).

The communication apparatus described in the above embodiments may be a network device or a terminal device (a terminal device in the method embodiments), but the scope of the communication apparatus described in the present disclosure is not limited thereto, and a structure of the communication apparatus may not be limited. The communication apparatus may be a stand-alone device or may be a part of a larger device. For example, the communication apparatus may be:

(1) a stand-alone integrated circuit (IC), or a chip, or a system on chip or a subsystem;

(2) a set of one or more ICs, optionally, which may also include a storage component for storing data and a computer program;

(3) an ASIC, such as a Modem;

(4) a module that may be embedded within other devices;

(5) a receiver, a terminal device, a smart terminal device, a cellular phone, a wireless device, a handset, a mobile unit, a vehicle device, a network device, a cloud device, an artificial intelligence device, etc.; and (6) others, and so forth.

In the case that the communication apparatus may be a chip or a system on chip, the chip may be a processor and an interface. There may be one or more processors, and there may be a plurality of interfaces.

Optionally, the chip further includes a memory. The memory is configured to save a necessary computer program and data.

Those skilled in the related art may understand that, various illustrative logical blocks and steps listed in embodiments of the present disclosure, may be implemented by an electronic hardware, a computer software or a combination of an electronic hardware and a computer software. Whether the function is implemented by the hardware or the software depends on specific applications and design requirements for an overall system. Those skilled in the art may implement the functions by using various methods for each specific application, but such an implementation should not be understood as beyond the protection scope of embodiments of the present disclosure.

A system for determining a sidelink duration is further provided in embodiments of the disclosure. The system includes a communication apparatus (a first terminal device in the above method embodiments) serving as a terminal device in the above embodiments and a communication apparatus serving as a network device, or the system includes a communication apparatus serving as a terminal device (a first terminal device in the above method embodiments) and a communication apparatus serving as a network device in the above embodiments.

A readable storage medium with instructions stored thereon is further provided in the disclosure. When the instructions are executed by a computer, steps in the any one method embodiment are implemented.

A computer program product is further provided. The computer program product implements functions of the above any one method embodiment when executed by a processor.

In the above embodiments, the functions may be wholly or partially implemented by a software, a hardware, a firmware, or any combination thereof. When implemented by a software, the functions may be implemented in whole or in part in the form of a computer program product. The computer program product includes one or more computer programs. Procedures or functions according to embodiments of the present disclosure are wholly or partially generated when the computer program is loaded and executed on a computer. The computer may be a general purpose computer, a special purpose computer, a computer network, or other programmable device. The computer program may be stored in a computer-readable storage medium or transmitted from one computer-readable storage medium to another. For example, the computer program may be transmitted from one website, computer, server, or data center to another via wire (such as a coaxial cable, a fiber optic, a digital subscriber line (DSL)) or wireless (such as infrared, wireless, microwave). The computer-readable storage medium may be any available medium that may be accessed by a computer or a data storage device such as a server that integrates one or more of the available media, and a data center. The readable medium may be a magnetic medium (such as a floppy disk, a hard disk and a magnetic tape), an optical medium (such as a digital video disk (DVD)), or a semiconductor medium (such as a solid state disk (SSD)).

Those skilled in the art may understand that various numbers such as first and second involved in the disclosure are distinguished merely for convenience of description, and are not intended to limit the scope of embodiments of the disclosure, but also to indicate an order of precedence.

At least one in the present disclosure may also be described as one or more, and a plurality of may be two, three, four or more, which is not limited in the present disclosure. In embodiments of the present disclosure, for a kind of technical feature, technical features in the kind of technical feature are distinguished by "first", "second", "third", "A", "B", "C" and "D", and there is no order of precedence or magnitude between technical features described in "first", "second", "third", "A", "B", "C" and "D".

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for receiving a signal, performed by a user equipment (UE), comprising:

sending capability information to a base station, wherein the capability information is configured to indicate whether the UE supports a capability of receiving signals corresponding to different sub-carrier spacings (SCSs) simultaneously; and obtaining a scheduling instruction sent by the base station based on the capability information, and receiving the signals based on the scheduling instruction;

wherein the capability information is configured to indicate at least one of:

whether the UE supports a capability 1, wherein the capability 1 comprises: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, wherein the capability 2 comprises: when the positioning reference signal (PRS) to be measured and a reference signal of the current serving cell correspond to different SCSs, the UE being capable of receiving the PRS to be measured and the reference signal of the current serving cell simultaneously;

wherein sending the capability information to the base station comprises:

sending capability information indicating whether the UE supports the capability 1 and whether the UE supports the capability 2 to the base station;

wherein obtaining the scheduling instruction sent by the base station based on the capability information, and receiving the signals based on the scheduling instruction comprises:

determining the capability information indicating that the UE supports the capability 1 and the capability 2, obtaining a scheduling instruction for indicating that the PRS to be measured, the reference signal of the current serving cell and the data signal of the current serving cell are scheduled simultaneously on a target bandwidth part (BWP) which is sent by the base station, and receiving the PRS to be measured, the reference signal of the current serving cell and the data signal of the current serving cell simultaneously on the target BWP;

determining the capability information indicating that the UE supports the capability 1, and does not support the capability 2, obtaining a scheduling instruction for indicating that the PRS to be measured and the data signal of the current serving cell are scheduled simultaneously on the target BWP which is sent by the base station, and receiving the PRS to be measured and the data signal of the current serving cell simultaneously on the target BWP, and being incapable of measuring the reference signal of the current serving cell during a period of measuring the PRS to be measured by the UE;

determining the capability information indicating that the UE supports the capability 2, and does not support the capability 1, obtaining a scheduling instruction for indicating that the PRS to be measured and the reference signal of the current serving cell are scheduled on the target BWP which is sent by the base station, and receiving the PRS to be measured and the reference signal of the current serving cell simultaneously on the target BWP, and being incapable of receiving the data signal of the current serving cell during a period of measuring the PRS to be measured by the UE; or determining the capability information indicating that the UE does not support the capability 1, and does not support the capability 2, obtaining a scheduling instruction for indicating that the PRS to be measured is scheduled on the target BWP which is sent by the base station, and receiving the PRS to be measured on the target BWP, and being incapable of receiving the data signal of the current serving cell and being incapable of measuring the reference signal of the current serving cell during a period of measuring the PRS to be measured by the UE.

2. The method according to claim 1, wherein sending the capability information to the base station comprises one of:

sending the capability information to the base station via an information element (IE) MeasAndMobParameters signaling; or sending the capability information to the base station via an IE MeasAndMobParametersMRDC signaling.

3. The method according to claim 1, wherein the PRS to be measured comprises a PRS to be measured of a neighbor cell.

4. The method according to claim 1, wherein the reference signal of the current serving cell comprises at least one of:

a synchronous signal block (SSB) of the current serving cell;

a channel state information reference signal (CSI-RS) of the current serving cell; or a PRS of the current serving cell.

5. The method according to claim 1, wherein sending the capability information to the base station comprises one of:

sending capability information indicating whether the UE supports the capability 1 to the base station; or sending capability information indicating whether the UE supports the capability 2 to the base station.

6. The method according to claim 5, wherein in a case of sending the capability information indicating whether the UE supports the capability 1 to the base station, obtaining the scheduling instruction sent by the base station based on the capability information, and receiving the signals based on the scheduling instruction comprises:

determining the capability information indicating that the UE supports the capability 1, obtaining a scheduling instruction for indicating that the PRS to be measured and the data signal of the current serving cell are scheduled simultaneously on a target bandwidth part (BWP) which is sent by the base station, and receiving the PRS to be measured and the data signal of the current serving cell simultaneously on the target BWP; or determining the capability information indicating that the UE does not support the capability 1, obtaining a scheduling instruction for indicating that the PRS to be measured is scheduled on the target BWP which is sent by the base station, and receiving the PRS to be measured on the target BWP, and being incapable of receiving the data signal of the current serving cell during a period of measuring the PRS to be measured by the UE.

7. The method according to claim 5, wherein in a case of sending the capability information indicating whether the UE supports the capability 2 to the base station, obtaining the scheduling instruction sent by the base station based on the capability information, and receiving the signals based on the scheduling instruction comprises:

determining the capability information indicating that the UE supports the capability 2, obtaining a scheduling instruction for indicating that the PRS to be measured and the reference signal of the current serving cell are scheduled simultaneously on a target bandwidth part (BWP) which is sent by the base station, and receiving the PRS to be measured and the reference signal of the current serving cell simultaneously on the target BWP; or determining the capability information indicating that the UE does not support the capability 2, obtaining a scheduling instruction for indicating that the PRS to be measured is scheduled on the target BWP from the base station, and receiving the PRS to be measured on the target BWP, and being incapable of measuring the reference signal of the current serving cell during a period of measuring the PRS to be measured by the UE.

8. A method for receiving a signal, performed by a base station, comprising:

receiving capability information sent by a user equipment (UE), wherein the capability information is configured to indicate whether the UE supports a capability of receiving signals corresponding to different sub-carrier spacings (SCSs) simultaneously; and sending a scheduling instruction to the UE based on the capability information, and sending the signals to the UE based on the scheduling instruction;

wherein the capability information is configured to indicate at least one of:

whether the UE supports a capability 1, wherein the capability 1 comprises: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, wherein the capability 2 comprises: when a positioning reference signal (PRS) to be measured and a reference signal of a current serving cell correspond to different SCSs, the UE being capable of receiving the PRS to be measured and the reference signal of the current serving cell simultaneously;

wherein receiving the capability information sent by the UE comprises:

receiving capability information indicating whether the UE supports the capability 1 and whether the UE supports the capability 2 which is sent by the UE;

wherein sending the scheduling instruction to the UE based on the capability information, and sending the signals to the UE based on the scheduling instruction comprises:

determining the capability information indicating that the UE supports the capability 1 and the capability 2, sending to the UE a scheduling instruction for indicating that the PRS to be measured, the reference signal of the current serving cell and the data signal of the current serving cell are scheduled simultaneously on a target bandwidth part (BWP), and sending the PRS to be measured, the reference signal of the current serving cell and the data signal of the current serving cell simultaneously on the target BWP;

determining the capability information indicating that the UE supports the capability 1, and does not support the capability 2, sending to the UE a scheduling instruction for indicating that the PRS to be measured and the data signal of the current serving cell is scheduled simultaneously on the target BWP, and sending the PRS to be measured and the data signal of the current serving cell simultaneously on the target BWP, and being incapable of measuring the reference signal of the current serving cell during a period of measuring the PRS to be measured by the UE;

determining the capability information indicating that the UE supports the capability 2, and does not support the capability 1, sending to the UE a scheduling instruction for indicating that the PRS to be measured and the reference signal of the current serving cell are scheduled on the target BWP, and sending the PRS to be measured and the reference signal of the current serving cell simultaneously on the target BWP, and being incapable of scheduling the data signal of the current serving cell during a period of measuring the PRS to be measured by the UE; or determining the capability information indicating that the UE does not support the capability 1, and does not support the capability 2, sending to the UE a scheduling instruction for indicating that the PRS to be measured is scheduled on the target BWP, and sending the PRS to be measured on the target BWP, and being incapable of scheduling the data signal of the current serving cell and the reference signal of the current serving cell during a period of measuring the PRS to be measured by the UE.

9. The method according to claim 8, wherein receiving the capability information from the UE comprises one of:

receiving the capability information sent by the UE via an information element (IE) MeasAndMobParameters signaling; or receiving the capability information sent by the UE via an IE MeasAndMobParametersMRDC signaling.

10. The method according to claim 8, wherein the PRS to be measured comprises a PRS to be measured of a neighbor cell.

11. The method according to claim 8, wherein the reference signal of the current serving cell comprises at least one of:

a synchronous signal block (SSB) of the current serving cell;

a channel state information reference signal (CSI-RS) of the current serving cell; or a PRS of the current serving cell.

12. The method according to claim 8, wherein receiving the capability information sent by the UE comprises one of:

receiving capability information indicating whether the UE supports the capability 1 which is sent by the UE; or receiving capability information indicating whether the UE supports the capability 2 which is sent by the UE.

13. The method according to claim 12, wherein in a case of receiving capability information indicating whether the UE supports the capability 1 which is sent by the UE, sending the scheduling instruction to the UE based on the capability information, and sending the signals to the UE based on the scheduling instruction comprises:

determining the capability information indicating that the UE supports the capability 1, sending to the UE a scheduling instruction for indicating that the PRS to be measured and the data signal of the current serving cell are scheduled simultaneously on a target bandwidth part (BWP), and sending the PRS to be measured and the data signal of the current serving cell simultaneously on the target BWP; or determining the capability information indicating the UE does not support the capability 1, sending to the UE a scheduling instruction for indicating that the PRS to be measured is scheduled on the target BWP, and sending the PRS to be measured on the target BWP, and being incapable of scheduling the data signal of the current serving cell during a period of measuring the PRS to be measured by the UE.

14. The method according to claim 1, wherein in a case of receiving capability information indicating whether the UE supports the capability 2 which is sent by the UE, sending the scheduling instruction to the UE based on the capability information, and sending the signals to the UE based on the scheduling instruction comprises:

determining the capability information indicating that the UE supports the capability 2, sending to the UE a scheduling instruction for indicating that the PRS to be measured and the reference signal of the current serving cell are scheduled simultaneously on a target bandwidth part (BWP), and sending the PRS to be measured and the reference signal of the current serving cell simultaneously on the target BWP; or determining the capability information indicating that the UE does not support the capability 2, sending to the UE a scheduling instruction for indicating that the PRS to be measured is scheduled on the target BWP, and sending the PRS to be measured on the target BWP, and being incapable of scheduling the reference signal of the current serving cell during a period of measuring the PRS to be measured by the UE.

15. A base station device, comprising:

a transceiver;

a memory; and a processor respectively connected to the transceiver and the memory, configured to perform the method according to claim 8.

16. A user equipment (UE), comprising:

a transceiver;

a memory; and a processor respectively connected to the transceiver and the memory, and configured to:

send capability information to a base station, wherein the capability information is configured to indicate whether the UE supports a capability of receiving signals corresponding to different sub-carrier spacings (SCSs) simultaneously; and obtain a scheduling instruction sent by the base station based on the capability information, and receive the signals based on the scheduling instruction;

wherein the capability information is configured to indicate at least one of:

whether the UE supports a capability 1, wherein the capability 1 comprises: when a positioning reference signal (PRS) to be measured and a data signal of a current serving cell correspond to different SCSs, the UE being capable of receiving the PRS to be measured and the data signal of the current serving cell simultaneously; or whether the UE supports a capability 2, wherein the capability 2 comprises: when the positioning reference signal (PRS) to be measured and a reference signal of the current serving cell correspond to different SCSs, the UE being capable of receiving the PRS to be measured and the reference signal of the current serving cell simultaneously;

wherein the processor is configured to:

send capability information indicating whether the UE supports the capability 1 and whether the UE supports the capability 2 to the base station;

wherein the processor is configured to:

determine the capability information indicating that the UE supports the capability 1 and the capability 2, obtain a scheduling instruction for indicating that the PRS to be measured, the reference signal of the current serving cell and the data signal of the current serving cell are scheduled simultaneously on a target bandwidth part (BWP) which is sent by the base station, and receive the PRS to be measured, the reference signal of the current serving cell and the data signal of the current serving cell simultaneously on the target BWP;

determine the capability information indicating that the UE supports the capability 1, and does not support the capability 2, obtain a scheduling instruction for indicating that the PRS to be measured and the data signal of the current serving cell are scheduled simultaneously on the target BWP which is sent by the base station, and receive the PRS to be measured and the data signal of the current serving cell simultaneously on the target BWP, and being incapable of measuring the reference signal of the current serving cell during a period of measuring the PRS to be measured by the UE;

determine the capability information indicating that the UE supports the capability 2, and does not support the capability 1, obtain a scheduling instruction for indicating that the PRS to be measured and the reference signal of the current serving cell are scheduled on the target BWP which is sent by the base station, and receive the PRS to be measured and the reference signal of the current serving cell simultaneously on the target BWP, and being incapable of receiving the data signal of the current serving cell during a period of measuring the PRS to be measured by the UE; or determine the capability information indicating that the UE does not support the capability 1, and does not support the capability 2, obtain a scheduling instruction for indicating that the PRS to be measured is scheduled on the target BWP which is sent by the base station, and receive the PRS to be measured on the target BWP, and being incapable of receiving the data signal of the current serving cell and being incapable of measuring the reference signal of the current serving cell during a period of measuring the PRS to be measured by the UE.

* * * * *